United States Patent [19]
Brisson et al.

[11] Patent Number: 5,908,710
[45] Date of Patent: Jun. 1, 1999

[54] PROCESS FOR MANUFACTURING A CLAD SHEET WHICH INCLUDES AN ABRASION-RESISTANT LAYER MADE OF TOOL STEEL, AND CLAD SHEET OBTAINED

[75] Inventors: Jean-Georges Brisson; Jean Beguinot, both of Le Creusot, France

[73] Assignee: Creusot Loire Industrie, Puteaux, France

[21] Appl. No.: 08/047,434

[22] Filed: Apr. 15, 1993

[30] Foreign Application Priority Data

Apr. 16, 1992 [FR] France .................................. 92 04697

[51] Int. Cl.⁶ ..................................................... B32B 15/18
[52] U.S. Cl. ............................................. 428/683; 428/685
[58] Field of Search ...................... 428/683, 685

[56] References Cited

U.S. PATENT DOCUMENTS

| | | | |
|---|---|---|---|
| 2,874,082 | 2/1959 | Lens et al. ............................... | 148/31.5 |
| 3,522,111 | 7/1970 | Simmons et al. ........................ | 148/534 |
| 3,650,709 | 3/1972 | Morsing .................................. | 428/685 |
| 3,694,174 | 9/1972 | Briggs ..................................... | 428/683 |
| 3,855,015 | 12/1974 | Nemoto et al. .......................... | 428/683 |
| 3,956,809 | 5/1976 | Chivinsky ................................ | 428/685 |
| 4,058,650 | 11/1977 | Kiyonaga et al. ....................... | 428/683 |
| 4,464,209 | 8/1984 | Taira et al. ............................... | 148/529 |
| 4,593,776 | 6/1986 | Salesky et al. .......................... | 175/375 |
| 5,183,198 | 2/1993 | Tamehiro et al. ....................... | 148/529 |
| 5,213,905 | 5/1993 | Leger et al. ............................. | 428/683 |

FOREIGN PATENT DOCUMENTS

| | | |
|---|---|---|
| 2 142 360 | 4/1972 | Germany . |
| 2 309 871 | 8/1974 | Germany . |
| 244 360 | 4/1987 | Germany . |

OTHER PUBLICATIONS

Database WPIL Week 8313, Derwent Publications Ltd. London, GB; AN 83–30714K & JP–A–58–027 860 (Nippon Piston Ring) Feb. 18, 1983.

Metal's Handbook, 9th Ed., vol. 4, "Heat Treating", American Society for Metals, 1981, pp. 561–574, 589–599, 628–634. (no month).

*Primary Examiner*—John J. Zimmerman
*Attorney, Agent, or Firm*—Oblon, Spivak, McClelland, Maier & Neustadt, P.C.

[57] ABSTRACT

A block is produced by juxtaposition and joining of at least one plate made of tool steel and of at least one plate made from mild steel. The block is hot rolled and then it is cooled to a temperature below 200° C. The rolled block is tempered at a temperature above 450° C. after cooling. The clad sheet obtained includes a layer made of tool steel having a tempered martensitic structure and containing primary carbides and a fine dispersion of secondary carbides.

8 Claims, No Drawings

PROCESS FOR MANUFACTURING A CLAD SHEET WHICH INCLUDES AN ABRASION-RESISTANT LAYER MADE OF TOOL STEEL, AND CLAD SHEET OBTAINED

FIELD OF THE INVENTION

The invention relates to the manufacture of a clad sheet which includes an abrasion-resistant layer made of a steel of the tool-steel type and a layer made of an easily-weldable mild steel.

BACKGROUND OF THE INVENTION

In mining, quarrying, civil engineering or other sectors of industry, it is known to use clad sheets having an abrasion-resistant layer, made of tool steel, and an easily weldable layer made of mild steel, in order to produce equipment such as hopper casings, dozer blades or other devices subjected to abrasion.

These clad sheets are generally obtained by rolling and are used in the as-rolled cooled state. These clad sheets have the maximum hardness that it is possible to obtain and therefore a high abrasion resistance. But it is desirable to improve this abrasion resistance further. Moreover, during the cooling, after rolling, the clad sheets form a bimetal and distort. It is necessary to planish them. On account of the great hardness of the layer made of tool steel, this operation is difficult and generates large residual stresses in the clad sheets, stresses which are annoying during implementation and in use.

OBJECT OF THE INVENTION

The object of the present invention is to provide a process enabling clad sheets to be obtained having a layer made of tool steel, the abrasion resistance of which is improved and is free of residual stresses.

DETAILED DESCRIPTION OF THE INVENTION

For this purpose, the subject of the invention is a process for manufacturing a clad sheet which includes an abrasion-resistant layer made of tool steel and an easily weldable layer made of mild steel, consisting in producing a block by juxtaposition and joining of at least one plate made of tool steel and of at least one plate made of mild steel containing less than 0.25% carbon and having an carbon equivalent of less than 0.50%, in hot rolling the block, then in cooling it to a temperature below 200° C. and in cutting it in order to obtain at least one clad sheet, characterised in that, after cooling to a temperature below 200° C. and before cutting the block, the hot-rolled block undergoes a tempering treatment at a temperature above 450° C.

The block preferably is made up of two plates made of tool steel which are gripped tightly between two plates made of mild steel.

The cooling after rolling may be an air cooling.

The tempering temperature lies between 450° C. and 650° C. and preferably between 500° C. and 600° C.

The tool steel may have a chemical composition such that:
0.5%≦C≦2.5%
3%≦Cr≦16%
Mo≦2%
V≦2%
W≦2%
Mn≦2%
Ni≦3%
Si≦2%
and preferably:
1%≦C≦2% and
8%≦Cr≦13%.

The subject of the invention is also a clad sheet having improved abrasion resistance which includes a layer made of tool steel comprising, in its chemical composition, more than 0.5% C and more than 3% Cr and a layer made of mild steel comprising, in its chemical composition, less than 0.25% C and having a carbon equivalent of less than 0.50%, and the structure of the tool-steel layer of which is a tempered martensite containing a fine dispersion of secondary carbides. The tool-steel layer preferably also contains coarse primary carbides.

The tool steel contains, in its chemical composition:
0.5%≦C≦2.5%
3%≦Cr≦16%
Mo≦2%
V≦2%
W≦2%
Mn≦2%
Ni≦3%
Si≦2%
and, more particularly:
1%≦C≦2% and
8%≦Cr≦13%.

The clad sheets thus obtained are highly planar, are free of residual stresses, are easily weldable on one surface and have an improved abrasion resistance on the other surface.

The invention will now be described in more detail, but in a non-limiting way.

The clad sheets according to the invention are made up of a layer made of very hard tool steel clad on a layer of weldable mild steel called the base.

The class of tool steels is very broad and is principally characterised by a carbon content greater than 0.5% and generally less than 2.5% and a chromium content lying between 3% and 16%; this combination enables a self-hardening steel to be obtained having a very hard martensitic structure and possibly containing carbides. These steels may also contain carbide-forming elements such as molybdenum, vanadium or tungsten in amounts generally less than 2%. They furthermore contain manganese (less than 2%) and silicon (less than 2%) and may contain up to 3% nickel. The carbon content preferably lies between 1% and 2% and chromium between 8% and 13%. The high chromium contents are desirable in order to obtain primary carbides which precipitate upon solidification and which are quite coarse (their dimension is of the order of 10 µm).

The mild steels used for producing the base are structural steels containing carbon, silicon, manganese and possibly chromium, molybdenum, nickel, vanadium, copper and impurities. In order to be easily weldable, the steels contain less than 0.25% carbon and have a carbon equivalent of:

$$C_{eq} = C + \frac{Mn}{6} + \frac{Cr+Mo}{5} + \frac{Ni+Cu+V}{15} \leq 0.50\%$$

In order to produce a clad sheet according to the invention, a block is produced made up of two plates or inserts made of tool steel which are gripped tightly between two plates or bases made of mild steel. The assembly is fastened together and closed by a peripheral weld bead according to a technique known to the person skilled in the art.

The block is then heated above 1000° C. and hot rolled in order to obtain a rolled block, the dimensions of which correspond to the dimensions of the sheets which it is desired to obtain. The rolling is completed, for example, between approximately 800° C. and 900° C.

The rolled block is then left to air cool to a temperature in the vicinity of ambient temperature, for example 70° C. and in all cases less than 200° C. During this cooling, the plates made of tool steel undergo self-hardening and acquire a very hard martensitic structure; the layer made of mild steel acquires a structure of the ferrite-pearlite type.

After cooling, the rolled block is tempered at a temperature lying between 450° C. and 650° C. and preferably between 500° C. and 600° C. in order to relax the stresses induced in the clad layers, to soften the martensitic matrix and to cause secondary carbides to be precipitated.

The relaxation of the stresses, since this is performed in a closed and clamped block, is manifested by a planishing of the clad sheets.

This thermal self-planishing therefore has the result of correcting the natural bimetallic-effect distortion without having to carry out the usual planishing operation on a mechanical planisher, this operation being dangerous on this type of hard product and generating in all cases high residual stresses.

The precipitation of fine secondary carbides of dimension of the order of 1 $\mu$m makes it possible to limit the softening of the as-tempered martensitic matrix.

The tempering temperature is chosen to be above 450° C. because, below this, the relaxation of the stresses is insufficient and the precipitation of the secondary carbides is very low. It does not exceed 650° C. because, above this, the martensitic structure becomes too soft and because it has to remain below the austenitic-transformation temperature.

After tempering, the rolled block is cut along its perimeter, which enables two highly planar clad sheets to be obtained with have a layer made of weldable mild steel having a ferrite-pearlite structure and a layer made of very hard tool steel having a softened martensitic structure containing a fine precipitation of secondary carbides and, if the carbon and chromium contents are sufficient, coarse primary carbides having precipitated upon solidifying.

Surprisingly, it has proved to be the case that these air-quenched and tempered tool steels had an abrasion resistance very markedly greater than that of the same as-quenched tool steels, which are a priori harder. This is probably explained by the fine precipitation of chromium carbides.

By way of example, clad sheets were produced whose tool-steel layer was made up of a D2-type steel according to the American Standard AISI and having the composition:

| C | Si | Mn | Ni | Cr | Mo | V |
|---|---|---|---|---|---|---|
| 1.5% | 0.34% | 0.35% | 0.19% | 11.5% | 0.72% | 0.92% |

The tempering temperature was 500° C. and the hardness of the layer made of tool steel was 54 HRC.

Comparative tests were carried out between this clad sheet and a clad sheet whose tool-steel layer had the same composition but which had not undergone tempering (as-cooled state) by causing specimens to rotate in quartz granulates and by measuring the weight loss after a defined time. It has proved to be the case that the weight loss of the specimen having undergone a tempering treatment was 30% less than the weight loss of the as-quenched specimen, that is a 30% increase in abrasion resistance.

We claim:

1. A planar clad sheet having improved abrasion resistance and being substantially free of residual stresses, comprising a layer made of tool steel having a chemical composition comprising, by weight, more than 0.5% carbon and more than 3% chromium and a layer made of low alloy steel having a chemical composition comprising, by weight, up to 0.25% carbon and a carbon equivalent up to 0.5% the layer made of low-alloy steel having a rolled structure and the layer made of tool steel having a rolled structure and comprising tempered martensite, coarse primary carbides and a fine dispersion of secondary carbides.

2. The clad sheet according to claim 1, wherein the layer made of tool steel has a chemical composition comprising, by weight:

$0.5\% \leq C \leq 2.5\%$ $3\% \leq Cr \leq 16\%$ $Mo \leq 2\%$ $v \leq 2\%$ $W \leq 2\%$ $Mn \leq 2\%$ $Ni \leq 3\%$ $Si \leq 2\%$.

3. The clad sheet according to claim 2, wherein the layer made of tool steel has a chemical composition comprising, by weight: $1\% \leq C \leq 2\%$, $8\% \leq Cr \leq 13\%$.

4. The clad sheet according to claim 2, wherein said sheet is produced by joining said layer of tool steel and said layer of low alloy steel, hot rolling said joined layers, cooling said hot rolled joined layers to below 200° C. and tempering said cooled joined layers at a temperature between 450° C. and 650° C.

5. The sheet according to claim 1, wherein said coarse primary carbides have dimensions of approximately 10 $\mu$m and said secondary carbides have dimensions of approximately 1 $\mu$m.

6. The sheet according to claim 5, wherein said tool steel has a carbon content of from 1 to 2% by weight and a chromium content of from 8 to 13% by weight.

7. The sheet according to claim 4, wherein said coarse primary carbides have dimensions of approximately 10 $\mu$m and said secondary carbides have dimensions of approximately 1 $\mu$m.

8. The sheet according to claim 5 wherein said tool steel layer has a hardness of 54 HRC and comprises the following elements in the indicated weight percentages:

| | |
|---|---|
| C | 1.5 |
| Si | 0.34 |
| Mn | 0.35 |
| Ni | 0.19 |
| Cr | 11.5 |
| Mo | 0.72 |
| V | 0.92. |

* * * * *